Sept. 7, 1937.    W. A. KIVELL    2,092,620
SEDIMENTATION APPARATUS
Filed Jan. 15, 1935    3 Sheets-Sheet 1

INVENTOR.
WAYNE A. KIVELL
BY
Arthur Middleton
ATTORNEY.

Sept. 7, 1937.  W. A. KIVELL  2,092,620
SEDIMENTATION APPARATUS
Filed Jan. 15, 1935  3 Sheets-Sheet 2

INVENTOR:
WAYNE A. KIVELL,
BY
ATTORNEY.

Sept. 7, 1937.　　　　W. A. KIVELL　　　　2,092,620
SEDIMENTATION APPARATUS
Filed Jan. 15, 1935　　　3 Sheets-Sheet 3
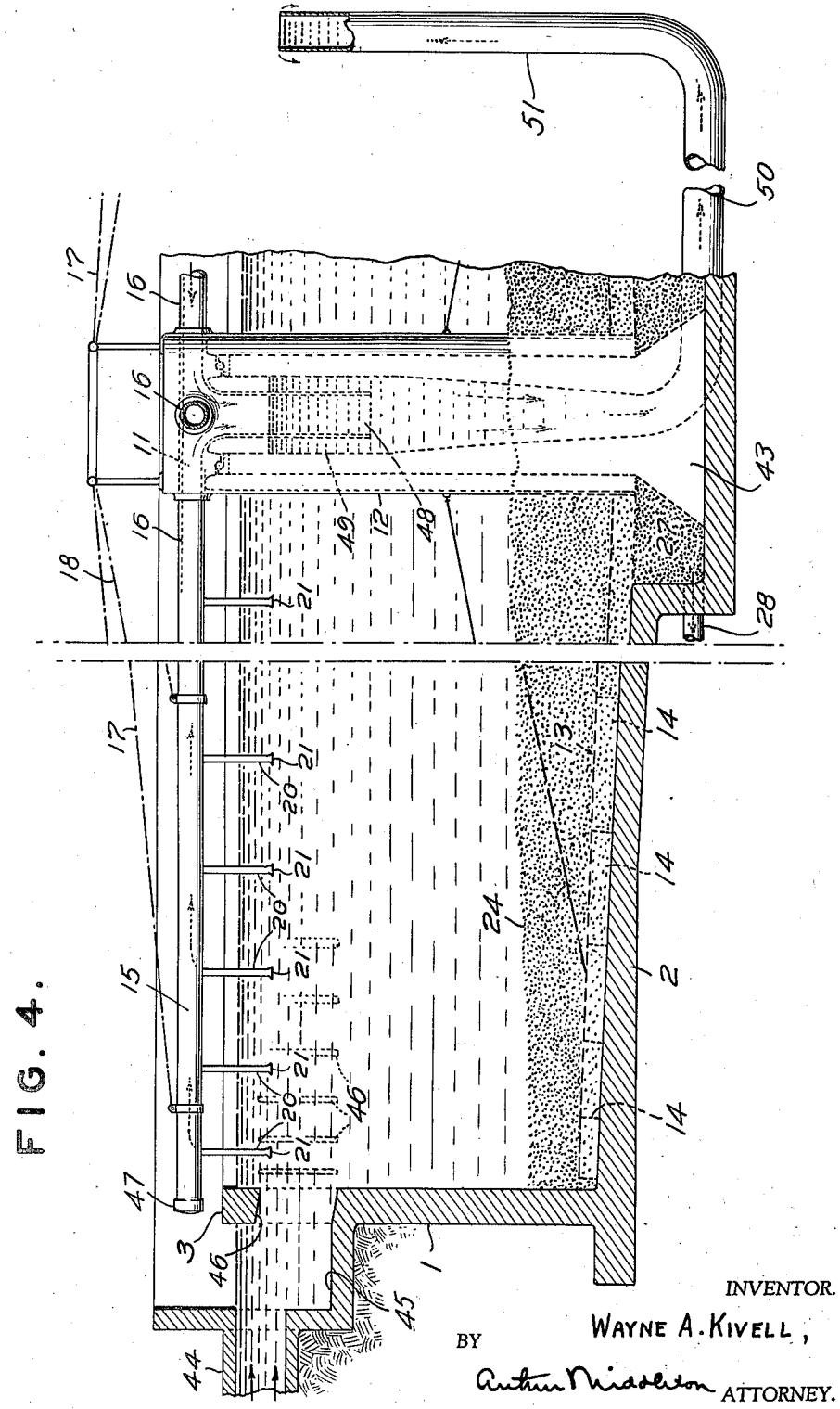
INVENTOR.
WAYNE A. KIVELL,
BY Arthur Middleton ATTORNEY.

Patented Sept. 7, 1937

2,092,620

UNITED STATES PATENT OFFICE 2,092,620

SEDIMENTATION APPARATUS

Wayne A. Kivell, Evanston, Ill., assignor to The Dorr Company, Inc., New York, N. Y., a corporation of Delaware Application January 15, 1935, Serial No. 1,861

20 Claims. (Cl. 210—3)

The invention relates to sedimentation apparatus. In the operation of a sedimentation unit it is necessary to provide means whereby the effluent can leave the upper portion of the liquid body within the tank in such a manner as to leave undisturbed the general top portion of the liquid, such sedimentation units are frequently referred to as clarifiers and by way of example, and not by limitation, it will be pointed out that they are frequently employed as clarifiers for treating flocculated water, raw sewage, activated sludge and liquids of many industrial processes.

It is well demonstrated that the clarity of the overflow or the uniform condition of the overflow, other factors or operating conditions being equal, increases with any reasonable increase in the number or amount of the overflow points that are on or adjacent to the surface of the body of liquid undergoing sedimentation, provided such collecting points are properly arranged or distributed. In other words, the clarity or uniformity of the effluent increases according to the increase in the corresponding length and general distribution of the functioning portions of the overflow section of the weir or the like in respect to which the effluent overflows or passes.

The installation of additional effluent troughs upon existing tanks treating activated sludge, for example, has increased the overflow rate at which clear liquid could be withdrawn. Thus, the problem is to increase the area of the surface from which the overflow is directly withdrawn. In the working out and solving of this problem, applicant has invented and provided a movable siphonic system or siphon pipe means having several intakes and which can be used in association with a stationary tank structure of a sedimentation apparatus. For example, according to one embodiment of the invention, a transversely extending siphon pipe means having transversely spaced intake receiving portions is provided. This pipe means moves longitudinally along the upper portion of the tank, the latter of which may be rectangular. During the longitudinal movement of the siphonic pipe means the clarified effluent is collected from several longitudinal sections of the upper portion of the body of liquid undergoing clarification. Under the influence of gravity, and by a siphonic action, the collected effluent is transferred through the neck or high portion of the siphon to and into a body of liquid maintained within an effluent launder from which the clarified liquid ultimately leaves the sedimentation unit.

According to another form or embodiment of the invention, a stationary, round or even relatively square tank may be used wherein there is employed in operative association with a rotatable mechanism therein a movable siphon pipe means. This siphon pipe means is preferably carried by the mechanism which carries the rotatable rakes, and turns about the vertical axis about which the raking mechanism in fact turns. In such construction as that just referred to, the siphon pipe means has inlets arranged at different radial distances from the axis, with the result that clarified liquid can be collected from several different circular sections at the upper portion of the body of liquid in the clarifier tank and can be readily conveyed by gravity and because of a siphonic action past the high point of the siphon to and into a receiving body of liquid maintained for example in an effluent launder provided at or about the upper portion of the tank, or as an alternative to a body of liquid provided in an effluent launder or outflow receiving space provided at or near the central portion of the tank.

The invention according to certain aspects or objects thereof is directed to and revolves about the embodiment of a movable siphon pipe means having several inlets or intake openings arranged for collecting clarified effluent from the main body of liquid undergoing sedimentation. The siphon pipe means is also constructed and arranged in respect to an effluent launder or receiving section whereby the collected liquid can be transferred by gravity and because of siphonic action past the high point of the siphon and so as to deliver the clarified liquid thus collected and transferred to and into a body of liquid maintained within the effluent launder or receiving basin.

According to the preferred arrangement of the invention and in order that the siphonic means will always function, regardless of the operating conditions experienced within the sedimentation unit, the inlets of the siphon and the discharge outlet of the siphon always remain submerged. Also according to a preferred arrangement and embodiment of the invention, the effluent launders are constructed so that in case an abnormal level of the body of liquid within the sedimentation tank is obtained, there can take place an overflow of the excess liquid directly into the effluent launder or effluent receiving section.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

Reference will now be made to the drawings forming a part of this specification and in which drawings:—

Fig. 4 is a view similar to Fig. 1 and shows a modified form of the invention.

Figure 1:
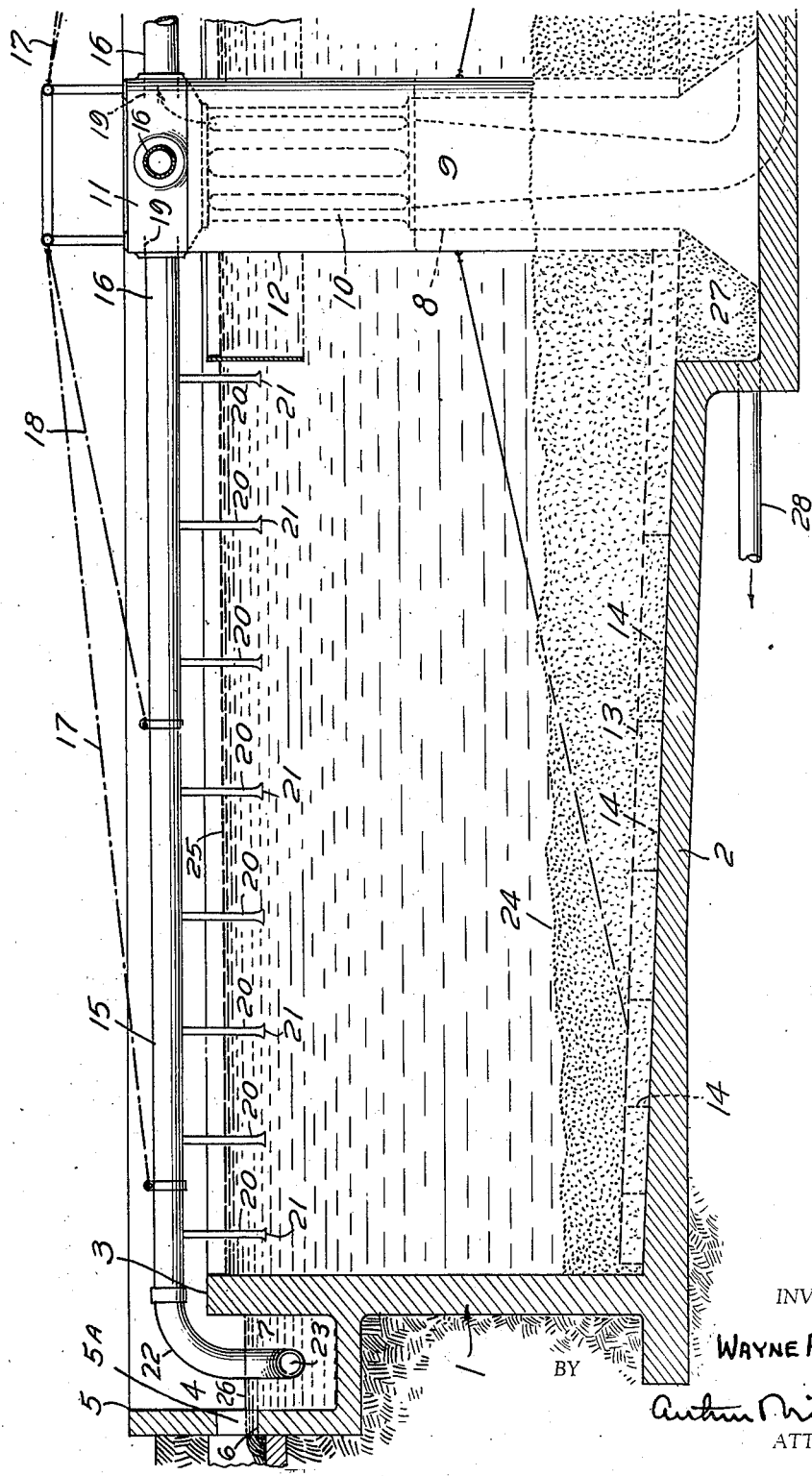
Fig. 1 is a vertical partial section of a clarifier of the circular tank type, and in this figure there will be seen a siphon pipe means which is operatively associated with and carried by the operating mechanism which is provided for actuating a sludge hoeing or scraping mechanism that is provided at and within the lower portion of the tank.
Figure 2:
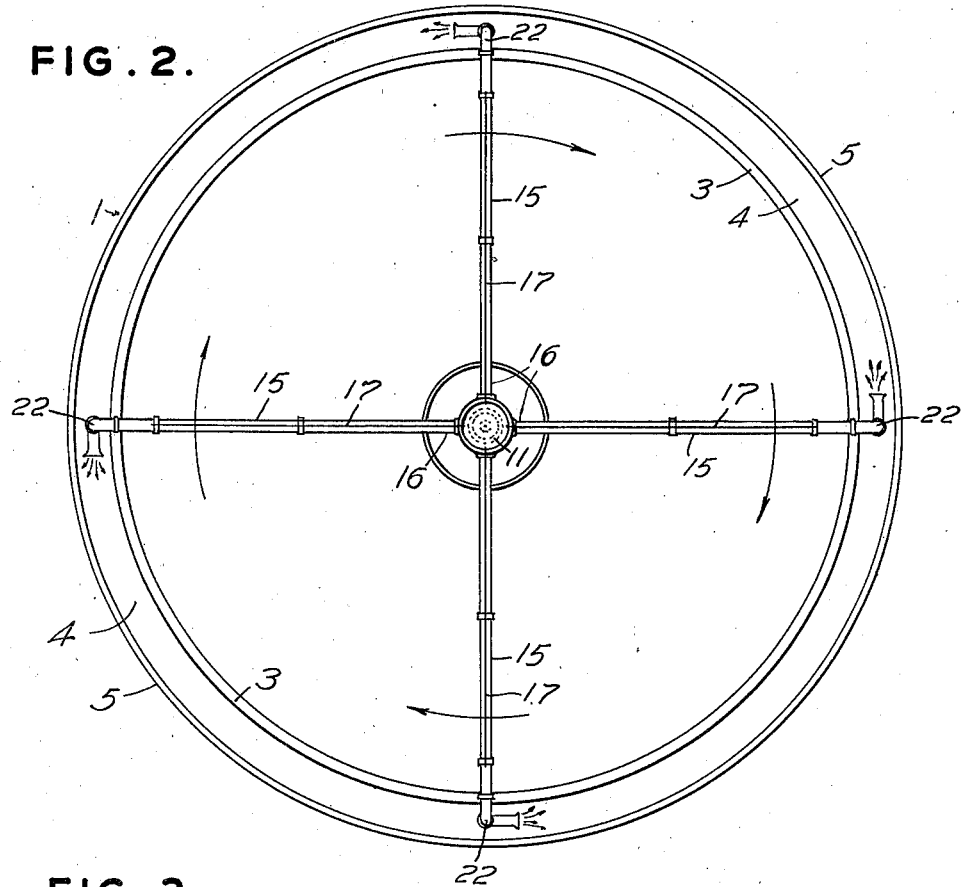
Fig. 2 is a plan view at considerable smaller scale of the sedimentation unit which is shown in partial section in Fig. 1.

Reference will now be made to the drawings in detail:

The round sedimentation tank or sedimentation unit is illustrated in Figs. 1 and 2. As has heretofore been pointed out, Fig. 1 is a partial sectional view at a somewhat larger scale than the plan view of Fig. 2. In these figures, the sedimentation tank is designated by 1 and has the bottom or floor portion 2 and an upstanding peripheral wall 3. This peripheral wall 3 constitutes or provides part of a circular effluent launder 4 having an upstanding wall section 5 that extends above the top of the peripheral wall 3. This effluent launder 4 has a discharge opening 5A which, in effect, provides a weir 6. This weir 6, in effect, determines the minimum height of the level of the liquid retained or maintained as a body 7 within the effluent launder 4. The sedimentation unit illustrated in this figure comprises a central pier or column 8 having an influent feed pipe or duct 9 terminating in an influent discharge section 10 whereby the influent to be clarified is discharged into and within the upper central portion of the tank. On this central pier there is suitably mounted mechanism and carrying parts such as comprise 11 and 12 that are relied upon for carrying the sludge hoeing or raking mechanism as 13 that comprises the sludge hoes or rakes indicated as 14. In Figs. 1 and 2 there is clearly shown siphon pipe means collectively designated as 15. There are four of these pipe means and each of these pipe means is carried by the mechanism which carries and operates the sludge rakes, with the result that the siphon pipe means rotates as and when the sludge scraping means is operated. More specifically, each of these pipe means is connected at its inner end 16 so as to directly receive support as from a member 11. The outwardly disposed sections of the pipe means receive support as through the medium of tension members or cables 17 and 18. In the arrangement as shown, the inner end of the pipe member 15 is blanked off or closed as at 19. Each of the siphon pipe means 15 has several intake pipes or sections as 20, arranged so that there is provided a number of inlet openings 21, each of which is disposed slightly under the lowermost liquid level that is permissible within the sedimentation tank. In other words, these inlets or the portions providing the inlet openings extend to a similar elevation which is at least slightly lower than that of the overflow, as determined by the weir 6 in the effluent launder. The siphon pipe means has a depending discharge section or portion 22 providing a discharge opening 23 (there may be a plurality of discharge openings 23) that preferably always remains submerged within the body of liquid 7 maintained within the effluent launder 4. The high point of the siphon is determined by the heighth of the wall 3 since the siphon pipe means must extend over or across the wall 3 and must have sufficient clearance whereby it will always be clear of the wall 3 as the siphon pipe means rotates about a vertical axis, which, in effect, is the vertical axis about which the raking mechanism 13 must rotate. The inlets 21 and the discharge openings 23 are all located below the overflow or weir 6 of the effluent launder whereby the inlets and discharge openings will remain sealed and whereby the siphon will not be broken. The upper portion of the wall 3, from one point of view may be considered as the wall of the sedimentation tank, and from another point of view it may be considered as a wall for the effluent launder, namely, as an effluent launder wall over which an excess amount of liquid can flow, should for any reason the level of the liquid within the sedimentation tank rise to and tend to rise above the upper portion of this wall. It will therefore be seen that the wall 3 provides an emergency overflow as between the interior of the sedimentation tank on the one hand and the effluent launder 4 on the other. In the normal functioning of the device the influent enters through the passage way or conduit 9 and passes through openings provided in the member 10 in such a manner that it is centrally discharged, thus passing into the main body of liquid and tending to pass into and throughout all sections of the body of liquid. For the influent thus supplied there is a sufficient time allowed for the sedimentation in the form of sludge, of the heavier solid particles that deposit and collect in a bed as 24, and the clarified supernatant liquid is withdrawn from the upper sections of the body of liquid. It will be noted that the intake pipes 20, or in other words, the intakes 21 thereof, are arranged at various radial distances from the center about which the siphon pipe means rotates, and that the intake pipes nearer the center are more closely arranged than are the intake pipes nearer the outer sections. The spacing of the intake pipes is progressively decreased in passing from the central section of the tank towards the periphery, in order to balance the amount of liquid withdrawn from each section; in other words, a circular section nearer the tank center is much shorter than a circular section nearer the outer portion of the tank and this progressively decreasing spacing of the intakes insures a relatively uniform withdrawal of clarified liquid from the upper portion of the tank as the siphon pipe means rotates. In the normal functioning of the tank the normal level maintained therein is illustrated by the line 25, while the overflowing level for the liquid issuing from the tank is illustrated by 26. Under these conditions there is a collecting of clarified effluent through the intakes 21 of the intake pipes 20, since the intake openings 21 are located within the upper interior portion of the tank and a relatively short distance below the normal liquid level thereof, under the influence of gravity and because of the existing siphonic action there is a transfer of the collected liquid past the high point of the siphon through the downtake 22 and into the effluent launder 4 whereby a body of liquid with a portion thereof overflowing is maintained within the effluent launder. If for any reason the influent should stop there will follow a cessation of the withdrawal through the siphon pipe means when, as, the general level within the tank and within the overflow approaches the general elevation of the overflow weir 6. As previously indicated, the collecting of sludge through the medium of rakes or scrapers 14 can be effected as the sludge raking means 13 rotates. Sludge thus raked or collected by scrapers 14 ultimately passes to a sludge receiving pocket or section 27 from which it can be drawn off through a sludge delivery pipe 28.

Figure 3:
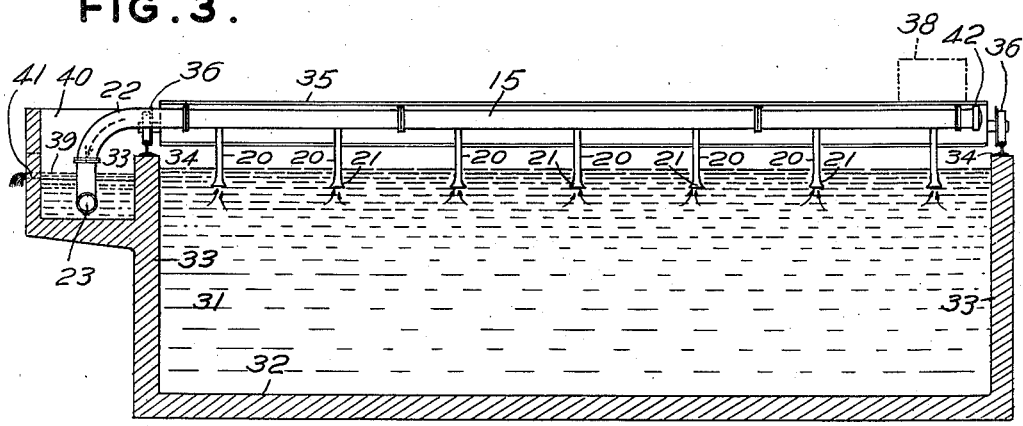
Fig. 3 is a transverse cross-section of a sedimentation unit employing a rectangular type of tank and having associated therewith and movable along the upper portion thereof a transversely extending siphon pipe means by which clarified effluent can be collected from sections of the body of liquid within the tank as the siphon pipe means is movable longitudinally along the tank.

Fig. 3 illustrates an application of the siphon pipe means employing basic features of the invention to a rectangular type of tank 31 having bottom 32 and side wall 33. In this figure a cross-section of the tank is illustrated. Supporting members as rails 34 are provided up and along the upper portions of the side walls 33 and thereby there is supported a carriage 35 which is supported by wheels 36 that travel along the rails 34. This carriage is operated so as to have back and forth movement in any suitable manner from a drive unit indicated at 38. This carriage supports a transversely extending siphon pipe means 15 having intake pipes 20 with inlets or intake openings 21. The siphon pipe means has a depending discharge section or portion 22 providing a discharge section or opening 23 that dips into a body of liquid 39 maintained within an overflow launder or receiving section 40. The effluent launder 40 has an overflow weir 41 that determines the minimum level of the liquid effluent which is to be maintained within the launder, and it will be noted that the inlet openings 21 are located below the general elevation as determined by the overflow weir 41. The siphon pipe means 15 is blanked off or closed at 42. This siphon pipe means functions substantially the same as the siphon pipe means described in connection with Figs. 1 and 2. In the arrangement, however, of the siphon pipe means of Fig. 3, the inlet pipes 20 are uniformly disposed across the tank and each functions to withdraw clarified supernatant liquid from a longitudinally extending section of the body of liquid as the siphon pipe means is reciprocated longitudinally over the tank.

It will be manifest that the sedimentation tank of Fig. 3 can be suppplied with influent in any manner well known, also that, if desired, sludge scraping means can be employed, although it is feasible to periodically remove the sludge collecting therein without the employment of mechanism therefor, if it is desired to do so.

In the construction of Figs. 1 and 2, the siphon pipe means is shown and described as delivering to an effluent launder provided at or near the peripheral section of the tank. By suitably modifying the construction shown, it will be feasible to have a side feed for the influent passing into the tank, and it will also be feasible to have a siphon discharge into a liquid receiving section or launder located centrally within the tank, thus employing the reversal of parts and an arrangement consequent to that reversal.

Such modified construction is shown in Fig 4 of the drawings, wherein, for the purpose of illustration there is shown a round sedimentation tank 1 provided with a bottom or floor 2, and an upstanding peripheral wall 3. The tank is also equipped with a hollow stationary upstanding central pier 43, on which are mounted mechanism carrying parts 11 and 12 for supporting the sludge-raking mechanism 13, provided with the rakes or scraping elements 14. It is understood that the parts 11 and 12 are rotatable on the pier 43, so as to cause the raking elements 14 to impel settled solids toward the sludge-receiving pocket 27, where they may be drawn off through a sludge-discharge pipe 28. The siphon supernatant-removal means 15 is composed of pipes 16 rigidly supported from the member 11 and guyed by the auxiliary elements 17 and 18. As in the other forms of the invention, each of the pipes 16 is provided with several intake pipes or risers 20, having inlet openings 21, positioned so as to be slightly below the liquid level normally maintained within the tank.

Polluted liquid to be clarified is supplied to the tank through the conduit 44, launder 45 and slotted openings 46, of which there may be any desired number.

In the present form the pipes 16 terminate laterally and have their outer ends sealed by means of a cap 47 or otherwise. At their inner ends, the pipes 16 communicate with a downwardly-extending pipe or discharge section 48, which extends well down into a liquid-receiving section 49 provided within the interior of the upstanding pier 43. The liquid-receiving section 49 extends downwardly throughout the length of the pier and leads into a discharge pipe 50, which may have an upstanding section 51 located without the tank 1, and ultimately terminating in or communicating with a suitable overflow box or launder, or from which the clarified supernatant may be ultimately discharged in any suitable manner.

In operation it is manifest that, as in the case of the construction of Fig. 1, when the tank 1 is filled with liquid so that the intake openings 21 are located a short distance below the liquid level and the pipe 50 and liquid-receiving section 49 are maintained filled with liquid so that the lower end of the pipe 48 will be submerged, there will be a siphonic influx of liquid into the risers 20 and through the pipes 16, and into the receiving section 49. The level of liquid within the section 49 will automatically remain slightly lower than that of the liquid within the tank, incident merely to the loss of head between the two bodies of liquid.

The intake pipes 20 are sometimes referred to as risers, since the effluent flowing therethrough passes upwardly to what may be viewed as a main collecting pipe of the siphon means 15.

I claim:

1. In combination in a clarifier, a sedimentation tank having a peripheral wall, means for delivering liquid to be clarified into the tank, an associated effluent launder arranged along an upper portion of the peripheral wall, and movable siphon pipe means for collecting clarified effluent from the upper interior portion of the tank and for discharging the collected effluent into the effluent launder; said siphon pipe means comprising a collecting section, a discharge section and an inverted U-shape siphon section located between said collecting and discharging sections, said collection section having a plurality of risers, the lowermost intake ends of which extend into the liquid receiving space within the sedimentation tank and are provided for collecting clarified liquor from within the upper interior portion of the tank, the discharge section having a lowermost delivery end that extends into a body of liquid maintained within the effluent receiving portion of the effluent launder, the delivery end of said delivery section being at a lower elevation than that of the lowermost intake ends of the risers, the top portion of said inverted U-shape siphon section being located so that it extends above and partly traverses the effluent launder, the inverted U-shape siphon section moving relative to and along said launder during the functioning of the siphon pipe means.

2. In combination in a clarifier, a sedimentation tank, means for supplying liquid to be clarified to the tank, sludge raking means provided for the lower interior sections of the tank, an effluent launder, and movable siphon pipe means provided for collecting clarified liquid from the upper interior portion of the tank and for transferring the thus collected liquid by gravity into said effluent launder; said siphon pipe means comprising risers that extend downwardly into the upper interior portion of the tank and also comprising a delivery section having the liquid discharge opening thereof located within the effluent launder and at a lower general elevation than that of the lowermost intake ends of the collecting risers, the high point of the siphon pipe means being provided between the intake ends of the risers on the one hand and the delivery end of the discharge section on the other hand and arranged whereby said siphon pipe means functions to convey by gravity clarified effluent from the upper interior portion of the tank into the effluent launder as the siphon pipe means moves along and relative to said extended wall portion of the effluent launder.

3. In combination in a clarifying apparatus, a sedimentation tank, an associated effluent launder wherein the effluent is maintained up to a predetermined level to serve as a liquid seal, and means for supplying to said tank liquid to be clarified therein and whereby the body of liquid will be maintained up to normal functioning levels within limited elevation ranges slightly higher than that of the sealing liquid maintained within the effluent launder, said apparatus being furthermore characterized in that a movable siphon pipe means is provided for collecting clarified liquid from the upper interior portions of the body of liquid maintained within the tank and for transferring the collected liquid by gravity to the body of effluent normally maintained within the effluent launder, said siphon pipe means comprising liquid collectors provided by horizontally spaced vertically extending intake risers, the lowermost intake ends of which extend downwardly into and slightly below the top of the body of liquid normally maintained within the tank and also comprising a discharge portion provided by a depending pipe that extends downwardly into and below the top of the liquid seal maintained within the effluent launder, said siphon pipe means also having the high point of the siphon section located between intake ends of the collecting risers on the one hand, and the discharge end of the discharged portion on the other hand, said siphon section being arranged so that the high portion thereof extends over a wall portion that normally serves to separate the liquid maintained within the tank from the sealing liquid maintained within the effluent launder but across which wall portion the liquid of the tank can overflow into the effluent launder in case the body of liquid within the tank substantially rises above its normal level.

4. In a clarifier, a sedimentation tank, an influent supply means, an effluent launder constructed to maintain a sealing body of liquid therein up to a predetermined level but so as to permit an overflow of liquid as the level thereof within the effluent launder tends to rise above said predetermined level, sludge raking mechanism provided for the lower interior section of the tank and siphon pipe means which is horizontally movable relative to the tank and which is provided for simultaneously collecting clarified liquid from several sections of the upper interior portion of the tank and for transferring the collected liquid by gravity to the body of sealing effluent maintained within the effluent launder, said siphon pipe means comprising horizontally spaced intakes that extend into the upper interior portion of the tank and also comprising a delivery section having a liquid discharge located within the effluent launder and at a lower general elevation than that of the lowermost portion of the collecting intakes, the siphon section of said pipe means being provided between the intakes and the discharge section and traversing a wall partition arranged whereby said siphon pipe means continues to function to convey by gravity clarified effluent from the upper interior portion of the tank into the effluent launder as the siphon pipe means horizontally moves when collecting clarified liquid.

5. A clarifier comprising in combination a sedimentation tank, an influent supply means leading thereto, an effluent launder, a siphon pipe means having the intake end of the siphon submerged in a body of liquid which is being clarified and which is substantially maintained within the tank, said siphon being movable with respect to said tank and having its delivery end submerged in a body of sealing liquid maintained within the effluent launder, said tank having a sludge discharge opening leading therefrom and means for causing the deposited sludge to pass to said opening preparatory to the sludge passing from the tank.

6. A clarifier having the arrangement of parts defined in and by claim 5, and in which the sludge collecting means is provided by a movable sludge raking mechanism with which the siphon piping means is operatively connected whereby the sludge raking mechanism and the siphon piping means can move in unison.

7. A clarifier having the combination features defined in and by claim 5, according to which the tank is provided with a rotatable sludge raking mechanism and a siphon pipe means each of which is movable along a general horizontal path.

8. A clarifier having the features of construction defined in and by claim 5 according to which the clarifier has a sludge raking mechanism that is operatively connected with respect to the siphon piping means whereby they simultaneously move in the same general direction.

9. A clarifier as defined in and by claim 5, according to which the siphon pipe means is associated with a raking mechanism and is driven by a carrier common to both in such a manner that the raking mechanism and the siphon pipe means together turn about a common vertical axis.

10. A clarifier as defined in and by claim 5, according to which the siphon pipe means turns about a vertical axis, and has a series of intake openings arranged at progressively decreasing radial distances in passing outwardly from the axis of rotation.

11. A clarifier as defined in and by claim 5, according to which the siphon pipe means is associated with a raking mechanism and is driven in such a manner that the raking mechanism and the siphon pipe means together turn about a common vertical axis, the piping means having a series of intake openings arranged at progressively decreasing radial distances in passing outwardly from the axis of rotation.

12. Sedimentation apparatus including a settling tank, means to supply thereto liquid to be clarified, travelling sludge raking means working within said tank, and siphon means to discharge clarified liquid from said tank carried by a part of said sludge rake within the tank and movable therewith, said siphon means having intake openings located within the upper interior portion of the tank and a relatively short distance below the normal liquid level thereof.

13. Sedimentation apparatus including a settling tank, means to supply thereto liquid to be clarified, means to receive clarified liquid, travelling sludge raking means working within said tank, means supporting said sludge raking means, and siphon means to discharge clarified liquid from said tank into said receiving means and carried by said sludge rake supporting means and movable with said raking means, said siphon means having intake openings located within the upper interior portion of the tank and a relatively short distance below the normal liquid level thereof.

14. Sedimentation apparatus comprising a tank including a sedimentation zone, means associated with said tank for receiving clarified supernatant liquid resulting from sedimentation, and travelling siphon means for conveying the clarified supernatant liquid from said tank to said receiving means, said siphon means having intake openings located within the upper interior portion of the tank and a relatively short distance below the normal liquid level thereof.

15. Sedimentation apparatus comprising a tank including a sedimentation zone, means associated with said tank adjacent the periphery thereof for receiving clarified supernantant liquid resulting from sedimentation, and travelling siphon means working within the tank for conveying the clarified supernatant liquid from said tank to said receiving means, said siphon means having intake openings located within the upper interior portion of the tank and a relatively short distance below the normal liquid level thereof.

16. Sedimentation apparatus comprising a tank including a sedimentation zone, means associated with said tank adjacent the center thereof for receiving clarified supernatant liquid resulting from sedimentation, and travelling siphon means working within the tank for conveying the clarified supernatant liquid from said tank to said receiving means, said siphon means having intake openings located within the upper interior portion of the tank and a relatively short distance below the normal liquid level thereof.

17. Sedimentation apparatus including a settling tank having a sedimentation zone, means exteriorly of the tank for receiving clarified supernatant liquid resulting from sedimentation, and traveling siphon means working within the tank for conveying the clarified supernatant liquid from said tank to said receiving means, said siphon means having intake openings located within the upper interior portion of the tank and a relatively short distance below the normal liquid level thereof.

18. Sedimentation apparatus including a settling tank having a sedimentation zone, means associated with said tank interiorly thereof for receiving clarified supernatant liquid resulting from sedimentation, and travelling siphon means working within the tank for conveying the clarified supernatant liquid from said tank to said receiving means, said siphon means having intake openings located within the upper interior portion of the tank and a relatively short distance below the normal liquid level thereof.

19. Sedimentation apparatus including a settling tank having a sedimentation zone, means associated with said tank exteriorly and adjacent the periphery thereof for receiving clarified supernatant liquid resulting from sedimentation, and travelling siphon means working within the tank for conveying the clarified supernatant liquid from said tank to said receiving means, said siphon means having intake openings located within the upper interior portion of the tank and a relatively short distance below the normal liquid level thereof.

20. Sedimentation apparatus including a settling tank, means to supply thereto liquid to be clarified, travelling sludge raking means working within said tank, and means to discharge clarified liquid from the said tank carried by a part of said sludge rake and movable therewith, said discharge means having intake openings for clarified liquid located within the upper interior portion of the tank at a relatively short distance below the normal liquid level thereof.

WAYNE A. KIVELL.